United States Patent

[11] 3,624,259

[72] Inventor Eugene E. Galantay
 Morristown, N.J.
[21] Appl. No. 1,914
[22] Filed Dec. 30, 1969
[45] Patented Nov. 30, 1971
[73] Assignee Sandoz-Wander, Inc.
 Hanover, N.J.
 Original application Apr. 14, 1966, Ser.
 No. 542,494, now Patent No. 3,502,686,
 which is a continuation-in-part of
 application Ser. No. 455,989, May 14,
 1965, now Patent No. 3,449,428. Divided and this application Dec. 30,
 1969, Ser. No. 1,914

[54] TETRACYCLIC COMPOUNDS
 5 Claims, No Drawings
[52] U.S. Cl. .................................................. 260/479 R,
 260/566 A, 260/590
[51] Int. Cl. .................................................... C07c 49/76,
 C07c 49/82, C07c 131/00
[50] Field of Search .................................... 260/479 R,
 590, 566 A

[56] References Cited
 UNITED STATES PATENTS
3,358,027 12/1967 Van Der Stelt ............... 260/576
3,459,806 8/1969 Frey et al. ..................... 260/590

Primary Examiner—James A. Patten
Attorneys—Gerald D. Sharkin and Frederick H. Weinfeldt ABSTRACT: 1-nitroso-or 1-isonitroso-1,2,6,7-tetrahydro-11bH-benzo [j]benz[c,d]azulen-2-ones, which may be unsubstituted or substituted at the 3,4,5,8,9 and 10- positions, by hydroxy, lower alkoxy, lower alkanoyloxy or benzylocy functions, are useful as intermediates in preparation of corresponding 1-amino-1,2,6,7-tetrahydro-11bH-benzo [j]benz[c,d]azulenes which may be unsubstituted or substituted by an oxo or hydroxy function at the 2-position which compounds are useful as pharmaceuticals. Said intermediates bearing 1-nitroso or 1-isonitroso functions are obtainable by nitrosation of 1,2,6,7-tetrahydro-11bH-benzo-[j][c,d]azulen-2-one or an appropriate substituted derivative thereof.

TETRACYCLIC COMPOUNDS

This application is a divisional application of copending application Ser. No. 542,494, filed Apr. 14, 1966, now U.S. Pat. No. 3,502,686 which in turn is a continuation-in-part of my copending application, Ser. No. 455,989, filed May 14, 1965, which is now U.S. Pat. No. 3,449,428.

This invention relates to tetracyclic compounds. In particular, the invention is concerned with dibenzazulenes. The invention is also concerned with intermediates which are useful in the preparation of the above compounds.

The dibenzazulenes of the present invention may be represented

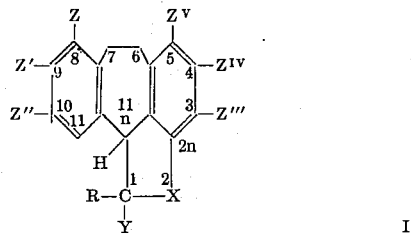

Wherein: X Represents $CH_2$; CHOH; or C—O;
Y represents —$NH_2$; —NR'R''; or a saturated monocyclic ring

containing in the ring, in addition to the nitrogen atom, from two to six carbon atoms or from three to five carbon atoms and one additional hetero atom of group nitrogen, oxygen and sulfur, e.g., loweralkylenimino such as ethylenimino, propylenimino, pyrrolidinyl, piperidino and hexamethylenimino, piperazino, 1-loweralkyl-4-piperazinyl, morpholino, thiomorpholino, imidazolidinyl, pyrazolidinyl and thiazolidinyl;

R and R' each represent hydrogen or lower alkyl, preferably containing from one to four carbon atoms, e.g., methyl, ethyl, propyl, isopropyl and butyl;

R'' represents lower alkyl, preferably containing from one to four carbon atoms, e.g., methyl, ethyl, propyl, isopropyl and butyl;

Z, Z', Z'', Z''', $Z^{Iv}$ and $Z^r$ each represent hydrogen; hydroxy; lower-alkoxy, preferably containing from one to four carbon atoms, e.g., methoxy, ethoxy, propoxy and butoxy; lower alkanoyloxy, preferably containing from two to five carbon atoms, e.g., acetoxy, propionyloxy and butyryloxy; or benzyloxy.

The compounds of structural formula I wherein all of the substituents are as defined with the exception that Y is other than amino ($NH_2$), may be prepared by halogenating 1,2,6,7-tetrahydro-11bH-benzo[j]benz[c,d]azulen-2-one or an appropriately substituted derivative thereof to form the corresponding 1-halo-1,2,6,7-tetrahydro-11bH-benzo[j]benz[c,d]azulen-2-one and then reacting the latter with an appropriate amine to form the corresponding 1-substituted amino-1,2,6,7-tetrahydro-11bH-benzo[j]benz[c,d]azulen-2-one. The latter can then be reduced to form the corresponding azulenes of formula I wherein X is either CHOH or $CH_2$. This process may be represented as follows:

REACTION SEQUENCE I

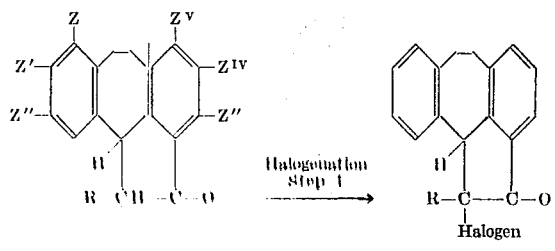

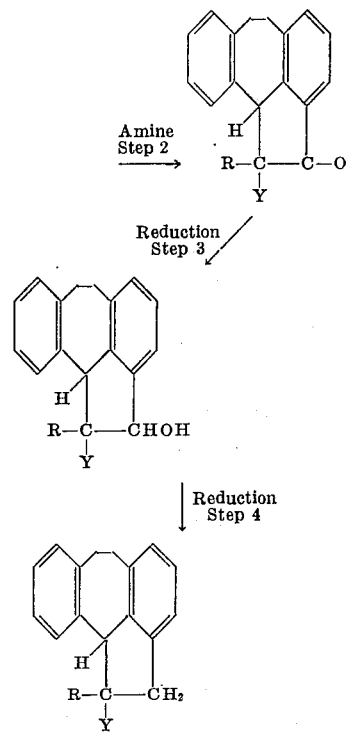

As noted above, Y is this sequence may be any substituent as previously defined except amino ($NH_2$).

In the above process as well as those which follow hereinafter the nuclear substituents (Z-$Z^{Ir}$) are for convenience, illustrated only with respect to the starting compounds. However, it is to be understood that all of the compounds represented therein likewise contain said substituents.

The halogenation of compound II (step I) is carried out in conventional manner employing an inert organic solvent and a halogenating agent generally used in reactions of this nature. However, it is preferred to employ a brominating agent such as cupric bromide. In step 2 the halide intermediate (preferably the bromide) is reacted with an appropriate amine to form the corresponding secondary or tertiary amino derivatives. The amination is carried out in conventional manner employing the usual conditions for reactions of this nature. Preferably, the amination is effected in an inert organic solvent, such as ether, benzene or toluene, and at room temperature or elevated temperatures employing an excess of the amine. The resulting compounds can then be converted to the corresponding 2-hydroxy derivatives by reduction (step 3). The reduction is carried out employing conventional conditions commonly used for reducing ketones to the corresponding alcohols. Similarly, step 4 which involves the reduction of the 2-hydroxy derivatives to the corresponding azulene can be effected employing conventional conditions for reducing alcohols to the corresponding hydrocarbon. As noted in the reaction sequence, the reductions of steps 3 and 4 can be effected in a single step to obtain compounds wherein X in structural formula I is $CH_2$. Such reduction is effected employing conventional conditions for reducing ketones directly to the corresponding hydrocarbon. Each of the products prepared by this process can be recovered by conventional methods.

The above process is particularly suitable for the preparation of those unsubstituted and nuclearly substituted compounds of structural formula I wherein X is as defined and Y is a tertiary amino group and although it can also be used for preparing compounds of formula I wherein X is CHOH or $CH_2$ and Y is a secondary amino group such compounds are more conveniently prepared by another process described hereafter. It should further be noted that the compounds of formula I wherein Y is a secondary amino group and X is carbonyl may be somewhat unstable as a free base. Accordingly, it is desirable that such compounds be isolated as salts, as soon as possible, even if reduction thereof to the corresponding hydroxy derivative is contemplated.

The compounds of structural formula I wherein X is carbonyl, Y is amino ($NH_2$) and the remaining substituents are as defined, are in the free base form very unstable, and in a basic medium, such as employed in the amination step of the above process, decompose almost as soon as they are formed so that isolation of the same is not practical. Accordingly, such compounds are more readily prepared and isolated in the form of their acid addition salts. Such salts can be prepared by nitrosation of 1,2,6,7-tetrahydro-11bH-benzo[j]benz[c,d]azulen-2-one or an appropriate substituted derivative thereof to form the corresponding 1-lower alkyl-1-nitroso-1,2,6,7-tetrahydro-11bH-benzo[j]benz[c,d]azulen-2-one or 1-isonitroso-1,2,6,7-tetrahydro-11bH-benzo-[j]benz[c,d]azulen-2-one depending on whether or not the 1-position of the starting compound is unsubstituted or contains a lower alkyl substituent. The resulting 1-lower alkyl-1-nitroso derivative or 1-isonitroso derivative is then reduced in a solvent system which also serves as an acylating medium to form the corresponding 1-lower alkyl-1-acylamino or 1-acylamino derivative, respectively, which can then be readily hydrolyzed to form an acid addition salt of the desired 1-lower alkyl-1-amino-1,2,6,7-tetrahydro-11bH-benzo[j]benzc,d]-azulen-2-one or 1-amino-1,2,6,7-tetrahydro-11bH-benzo[j]benz[c,d]azulen-2-one. This process is represented by reaction sequence II below.

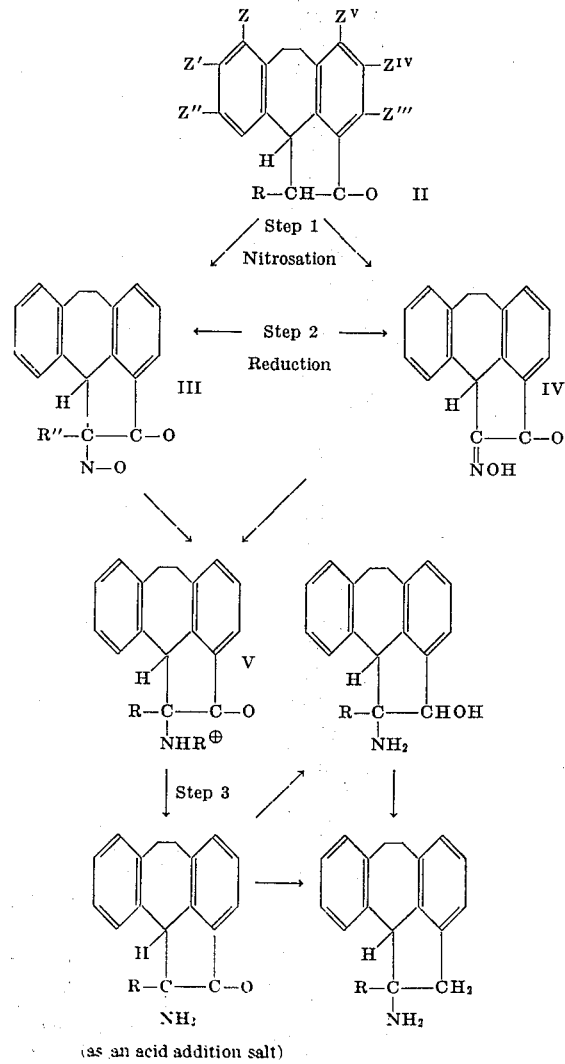

REACTION SEQUENCE II

Wherein R, R'', Z, Z', Z'', Z''', $Z^{iv}$ and $Z^v$ are as defined and R° represents Acyl, preferably alkanoyl having from two to four carbon atoms, e.g., acetyl, propionyl and butyryl.

As is evident from reaction sequence II, step 1 involves nitrosation of the 1,2,6,7-tetrahydro-11bH-benzo[j]benz[c,d]azulen-2-one(II) to form the corresponding 1-nitroso derivative (III) or 1-isonitroso derivative (IV). This is conveniently effected in conventional manner employing an appropriate inert organic solvent and a nitrite preferably, a lower alkyl nitrite such as ethyl nitrite, butyl nitrite or amyl nitrite. Preferably the reaction is carried out at a temperature below room temperature, e.g., 0°–5° C. and in the presence of a strong anhydrous acid such as hydrochloric acid. The resulting products (III) and (IV) are recovered in conventional manner. Step 2 involves the conventional reduction, preferably catalytic, of the nitroso or isonitroso group. As previously noted, the reduction is carried out employing a solvent system which can also serve as an acylating agent so as to form the acylamino derivative (V) rather than the unstable amine base. Suitable solvents for this purpose are mixtures of a lower alkanoic acid and its corresponding anhydride, e.g., acetic acid and acetic anhydride, propionic acid and proionic anhydride, and butyric acid and butyric anhydride. Insofar as the reduction is concerned, the usual conditions for effecting reductions of this nature are employed. The resulting acylamino derivative is then hydrolyzed (step 3) under acetic conditions to obtain the stable acid addition salt of the desired 1-amino derivative. The hydrolysis is carried out in conventional manner with, e.g., hydrochloric acid, hydrobromic acid and the like and the salt can be recovered employing conventional techniques. Such salt can be readily converted to the corresponding 1-amino-2-hydroxy derivative or 1-amino-dibenzazulene derivative in the same manner as set forth with regard to steps 3 and 4 of reaction sequence I.

The compounds of structural formula I wherein X is CHOH and the other substituents are as previously defined (except that Y is other than a heterocyclic ring containing more than one hetero atom,) may also be prepared by reduction of the 1-nitroso or 1-isonitro derivative (compounds of formulas III or IV) to form the corresponding 1-amino-2-hydroxy derivative which can then be reacted with an alkylating agent or a bifunctional alkylating agent (e.g., dihaloalkane). In this manner compounds of structural formula I wherein X is CHOH and Y is —$NH_2$, —NR'R'' or alkylenimino, can be obtained. This procedure is the preferred for obtaining compounds wherein X is CHOH and Y is a secondary amino group.

Alternatively, compounds of structural formula I wherein X is CHOH and Y is amino ($NH_2$) or a secondary amino group may be prepared via reduction of the 1-nitroso or 1-isonitroso derivative (compounds of formula III or IV) in an acylating medium to obtain the corresponding 1-acylamino-2-hydroxy derivative or 1-acylamino-2-acyloxy derivative. Such derivatives can be readily hydrolyzed to the 1-amino-2-hydroxy derivative or the 1-acylamino-2-hydroxy derivative can either be reduced directly or first cyclized to form a pentacyclic derivative and then reduced to obtain the corresponding 1-secondary amino-2-hydroxy derivative.

In a further alternative procedure for preparing compounds of structural formula I wherein X is CHOH and Y is amino ($NH_2$) or a secondary amino group, a 1-acylamino-dibenzazulen-2-one can either be (1) reduced to the corresponding 1-acylamino-2-hydroxy derivative which can then be hydrolyzed to obtain the 1-amino-2-hydroxy derivative or (2) reduced to obtain the 1-secondary amino-2-hydroxy derivative, or (3) cyclized to form a pentacyclic derivative which can then be converted to the 1-secondary-2-hydroxy derivative.

The various procedures referred to above are set forth under reaction sequence III.

REACTION SEQUENCE III

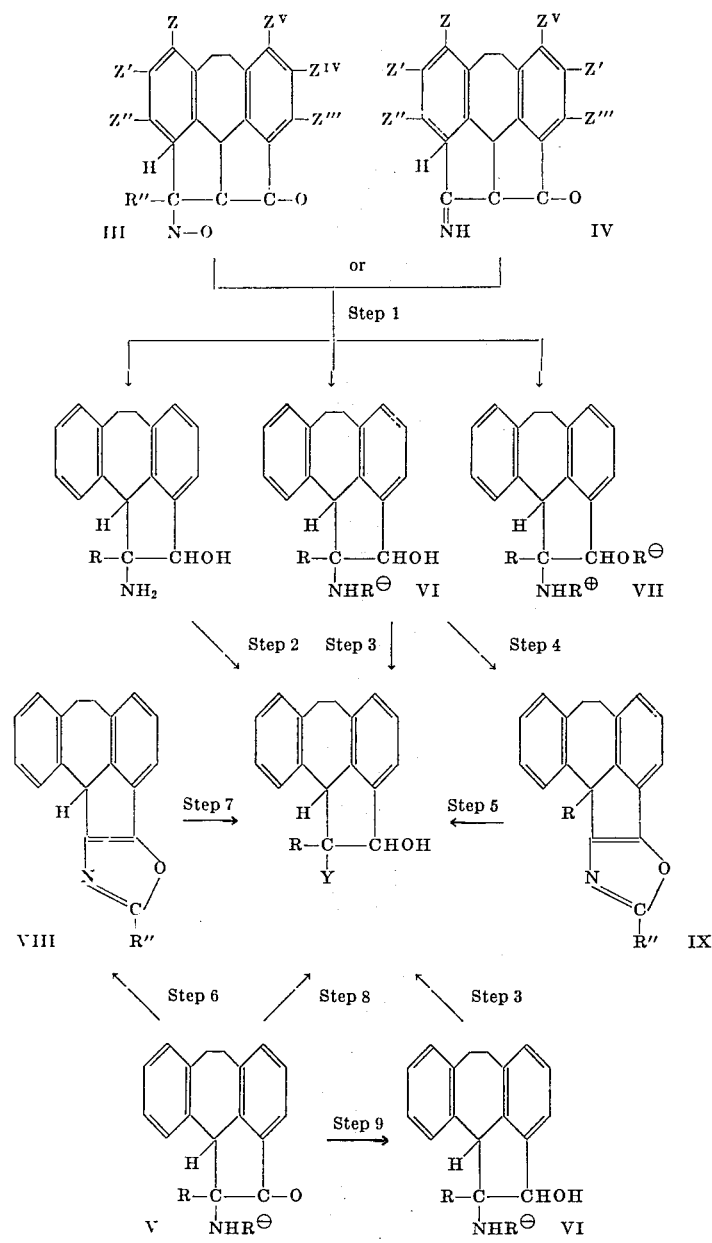

In the above formulas R°, R, R'', Y, Z, Z', Z'', Z''', $Z^{iv}$ and $Z^{v}$ are as previously defined (except that Y is other than a heterocyclic ring containing more than one hetero atom).

In step 1 of reaction sequence III, a 1-nitroso or 1-isonitroso derivative (III or IV) is either catalytically reduced in basic medium employing a suitable catalyst such as palladium black/ethanol or Raney Nickel to form the corresponding 1-amino-2-hydroxy derivative or reduced in an acylating medium such as a mixture of a lower alkanoic acid and its corresponding anhydride, e.g. acetic acid-acetic anhydride, propionic acid-propionic anhydride, and butyric acid-butyric anhydride, employing palladium/charcoal as a catalyst to form the corresponding 1-acylamino-2-hydroxy derivative (VI) or 1-acylamino-2-acyloxy derivative (VII), the latter being obtained by carrying out the reduction under forcing conditions such as by prolonged heating. The manner of carrying out the above reactions is well known in the art. The 1-acylamino-2-hydroxy derivative and 1-acylamino-2-acyloxy derivatives thus obtained can be readily hydrolyzed in conventional manner to the corresponding 1-amino-2-hydroxy derivative.

In step 2, the 1-amino-2-hydroxy derivative is reacted, in the conventional manner, with either a dihaloalkane to form the corresponding 1-alkylenimino-2-hydroxy derivative or an alkylating agent to form the corresponding 1-alkylamino-2-hydroxy derivative or 1-dialkylamino-2-hydroxy derivative. The conditions for carrying out such reactions are well known in the art. Compounds substituted at the 1-position with either an alkylamino group or dialkylamino group having the same alkyl substituents are conveniently prepared employing the required stoichiometric amount of the appropriate alkylating agent. Those compounds which are substituted at the 1-position with dimethylamino are readily prepared by the Eschweiler Clarke Modification. As for those compounds which are substituted at the 1-position with a dialkylamino group containing different alkyl substituents alkylation is effected in two steps each of which employs the appropriate alkylating agent. Compounds which are substituted at the 1-position with an alkylamino group can also be prepared in conventional manner by reacting the 1-amino-2-hydroxy derivative with benzaldehyde to form the corresponding 1-benzylideneamino-2-hydroxy derivative which is then hydrogenated to form the corresponding 1-benzylamino-2-hydroxy derivative. The latter is then alkylated in the manner described above to form the corresponding 1-(N-benzyl-N-alkyl)amino-2-hydroxy derivative and the latter debenzylated by catalytic hydrogenation. This process may be represented as follows:

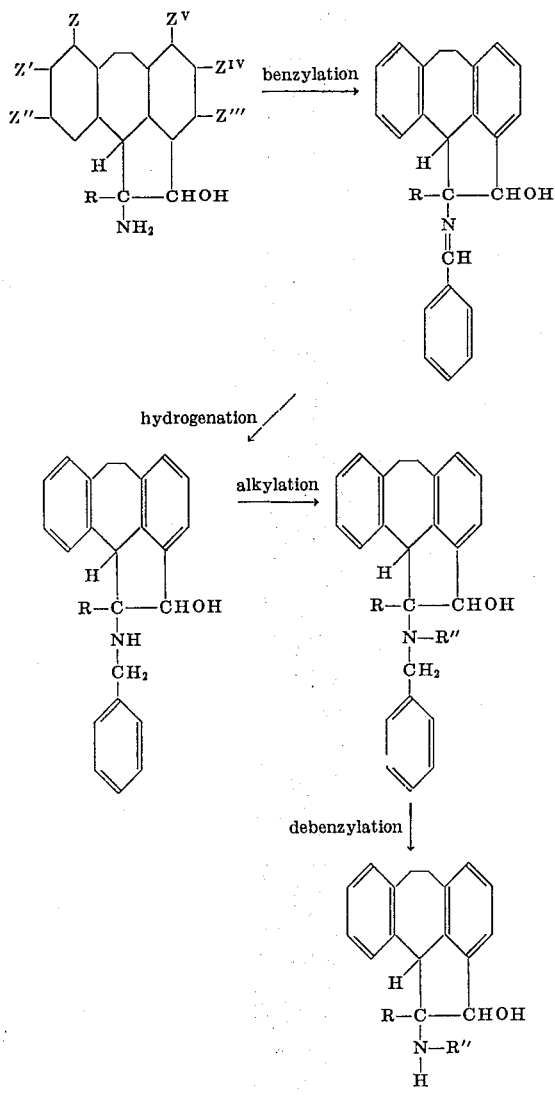

In the above formulas R, R'', Z, Z', Z'', Z''', $Z^{iv}$ and $Z^v$ are as previously defined. Each of the compounds prepared above can be isolated employing conventional techniques.

Step 3 of reaction sequence III involves the reduction of the 1-acylamino-2-hydroxy derivative (VI) to the corresponding compounds of formula I wherein X is CHOH and Y is an alkylamino group having at least two carbon atoms in the alkyl chain. The reduction is effected in the usual manner with lithium aluminum hydride or other catalyst generally used for reducing an acyl group to the corresponding hydrocarbon.

Step 4 involves the formation of a pentacyclic derivative (IX) by treatment of the 1-acylamino-2-hydroxy derivative (VI) with an appropriate agent conventionally used for effecting ring closure such as, for example, thionylchloride, phosphorus pentachloride and the like. The resulting pentacyclic derivative is then readily hydrolyzed in aqueous hydrochloric acid (step 5) to form the corresponding compounds of formula I wherein X is CHOH and Y is alkylamino containing at least two carbon atoms in the alkyl chain.

In step 6, a 1-acylamino-dibenz-azulen-2-one(V, R—H) is cyclized to form the pentacylic derivative (VII) by conventional dehydration with thionylchloride, phosphorus pentachloride and the like. The resulting pentacyclic derivative is then reduced with sodium in ethanol in conventional manner (step 7) to form the corresponding compounds of formula I wherein X is CHOH, Y is alkylamino containing at least two carbon atoms in the alkyl chain and R is hydrogen. Alternatively, the 1-acylamino-dibenz-azulen-2-one(V, R being hydrogen or lower alkyl) can be directly reduced with lithium aluminum hydride in conventional manner (step 8) to form the corresponding compounds of formula I wherein X is CHOH, Y is alkyl amino having at least two carbon atoms in the alkyl chain and R is hydrogen or lower alkyl.

Step 9 involves the conversion of a 1-acylamino-dibenz-azulen-2-one(V, R being hydrogen or alkyl) to the corresponding 1-acylamino-2-hydroxy derivative (VI). This is readily accomplished by conventional reduction with sodium borohydride or other appropriate reducing agent which is capable of selectively reducing the ring carbonyl without effecting the acyl group attached to such ring.

In all of the steps involved in reaction sequence III, the products obtained can be readily isolated employing conventional techniques.

The compounds of structural formula I wherein X is $CH_2$, R, Z, Z', Z'', Z''', $Z^{iv}$ and $Z^v$ are as defined and Y is other than a heterocyclic ring containing more than one hetero atom, may also be prepared by reduction of the 1-nitroso or 1-isonitroso derivative (compounds of formulas III or IV) to form the corresponding 1-amino-dibenz-azulene which can then be reacted with either a dihaloalkane or alkylating agent.

Alternatively, compounds of structural formula I wherein X is $CH_2$ and Y is amino ($NH_2$) or a secondary amino group may be prepared via reductions of the 1-nitroso or 1-isonitroso derivative in an acylating medium to obtain the corresponding 1-acylamino derivative. Such derivative can either be readily hydrolyzed to the 1-amino derivative or reduced to form the corresponding 1-secondary amino derivative.

The procedures referred to above are set forth under reaction sequence IV below.

REACTION SEQUENCE IV

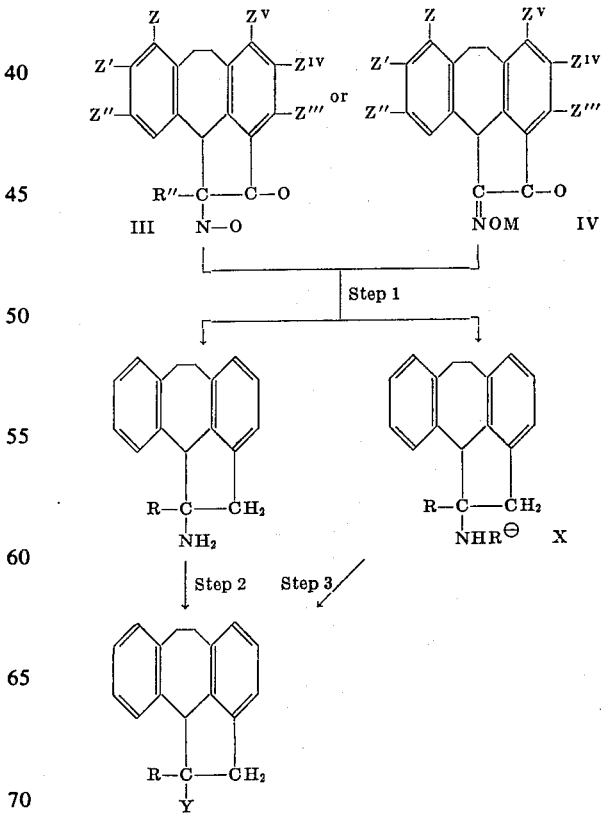

In the above formulas R, R'', Z, Z', Z'', Z''', $Z^{iv}$ and $Z^v$ are as previously defined and Y is other than a heterocyclic ring containing more than one hetero atom but as otherwise defined.

In step 1 of reaction sequence IV, the 1-nitroso derivative (III) or 1-isonitroso derivative (IV) is reduced in conventional manner employing, as a solvent, a mixture of a lower alkanoic acid, e.g., acetic acid, and a strong mineral acid, e.g., sulfuric acid and perchloric acid, and a suitable catalyst such as palladium. The 1-amino derivative thus obtained can be readily recovered in conventional manner. The corresponding 1-acylamino derivative (X) can be readily prepared by carrying out the above reduction in the added presence of an acylating agent such as a mixture of a lower alkanoic acid and its corresponding anhydride, e.g., acetic acid and acetic anhydride, propionic acid and propionic anhydride, and butyric acid and butyric anhydride. The 1-acylamino derivative can likewise be recovered in conventional manner.

In step 2, the 1-amino derivative is converted to the corresponding compound of structural formula I wherein Y is alkylenimino, by treatment with a dihaloalkane or to the corresponding compound of structural formula I wherein Y is alkylamino or dialkylamino, by treatment with an alkylating agent. These reactions are carried out in the same manner as described for step 2 of reaction sequence III above. The compounds thus obtained are readily recovered in conventional manner.

Alternatively, compounds wherein Y is an alkylamino group can be prepared via benzylation of the 1-amino derivative followed by hydrogenation, alkylation and debenzylation in the same manner as described herein above for the preparation of the corresponding 1-alkylamino-2-hydroxy derivative. This process is illustrated below. Each of the compounds obtained can be isolated employing conventional techniques.

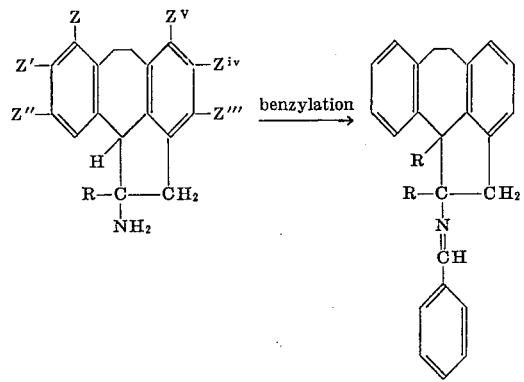

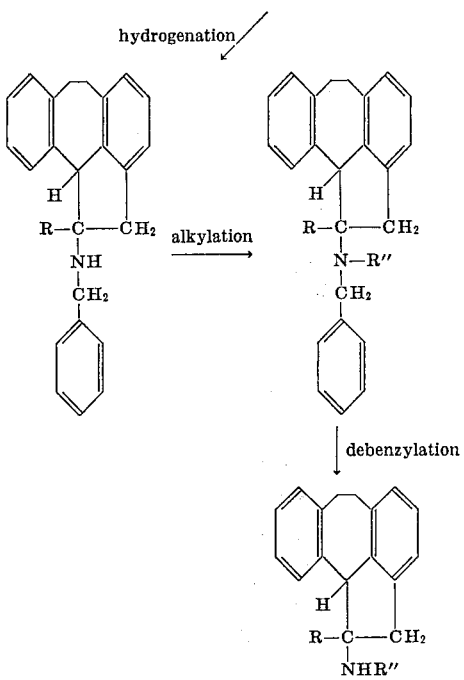

In the above formulas R, R'', Z, Z', Z'', Z''', $Z^{iv}$ and $Z^v$ are as previously defined.

In step 3 of reaction sequence IV, the 1-acylamino derivative (X) is reduced to the corresponding compounds of formula I wherein Y is alkylamino, employing conventional techniques for reducing an acyl group to a hydrocarbon, e.g., reduction with lithium aluminum hydride. The resulting 1-alkylamino derivative is readily recovered in conventional manner.

The starting compounds utilized in preparing the compounds of the present invention, namely, 1,2,6,7-tetrahydro-11bH-benzo[j]benz[c,d]azulen-2-one and the appropriately substituted derivatives thereof, are readily prepared from a 10,11-dihydro-5H-dibenzo[a,d]cyclohepten-5-one or a 1,2-diphenyl-ethane following any one of several procedures known in the art. Illustrative of such procedures employing a dibenzocycloheptenone are those set forth under reaction sequence V below.

REACTION SEQUENCE V

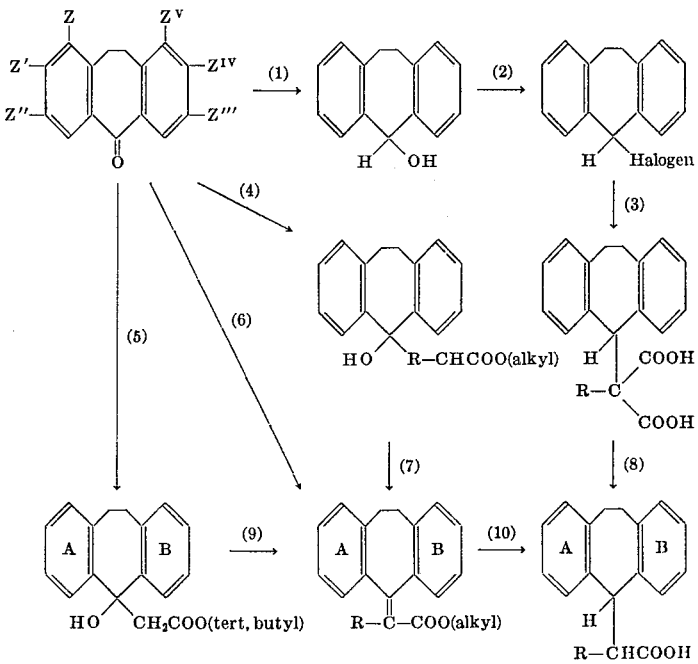

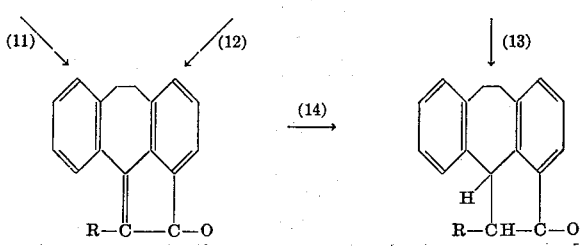

In the above formulas R, Z, Z', Z'', Z''', $Z^{iv}$ and $Z^v$ are as previously defined.

All of the above steps can be carried out following procedures described in the literature (see, for example, J. Org. Chem., 27, 230-240 (1962) and "Advances in Organic Chemistry," Vol. II, pp. 157-161, Interscience Publishers, Inc., New York, N.Y., 1960.) For convenience, the appropriate reactions for carrying out the above steps are enumerated below.

1. reduction employing sodium borohydride or lithium aluminum hydride.
2. halogenation employing hydrochloric or hydrobromic acid.
3. reaction with a malonic acid ester, e.g., diethylethoxymagnesiummalonate, followed by sapronfication.
4. Reformatsky reaction employing an α-bromocarboxylic acid ester.
5. Condensation with t-butyl acetate and diethylaminomagnesium bromide.
6. condensation with an alkoxyacetylene followed by acid catalyzed rearrangement.
7. dehydration.
8. decarboxylation.
9. dehydration and splitting of the tert-butyl ester group.
10. hydrogenation followed by sapronfication,
11. cyclization employing trifluoroacetic anhydride or a mixture of polyphosphoric acid and acetic acid.
12. hydrolysis followed by cyclization as in (11).
13. direct cyclization employing polyphosphoric acid or anhydrous hydrogen fluoride; or conversion of the acid to the acid chloride followed by cyclization employing the Friedel Crafts reaction.
14. hydrogenation, A suitable procedure for preparing the starting compounds used herein employing a 1,2-diphenylethane is illustrated by the following reaction sequence VI wherein R, Z, Z', Z'', Z''', $Z^{iv}$ and $Z^r$ are as previously defined.

REACTION SEQUENCE VI

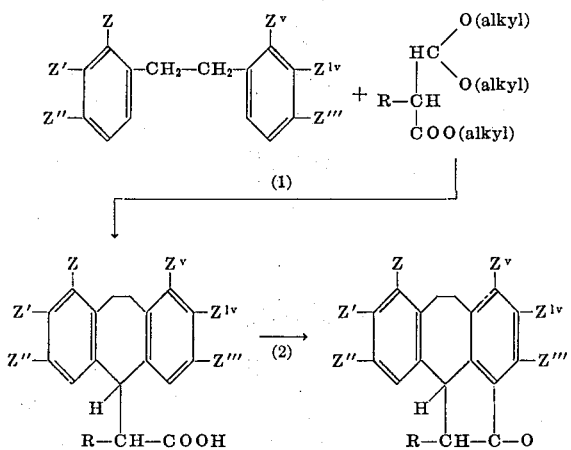

The appropriate reactions are as follows:
1. condensation with an ester of a β, β-di(lower)alkoxypropionic acid preferably in an acidic medium, e.g., in a mixture of acetic and sulfuric acids.

2. cyclization as indicated for (13) of reaction sequence V.

Many of the dibenzocycloheptenones and 1,2-diphenylethanes employed in the preceding two sequences are known compounds which can be prepared by procedures described in the literature. Such others which may not be specifically known may be prepared in a manner analogous to that described for the known compounds.

It will be readily appreciated by those skilled in the art that the cyclization carried out in steps 11, 12 and 13 of reaction sequence V and step 2 of reaction sequence VI will to some measure be affected by the nature, number and arrangement of the substituents attached to the benzene rings. In those instances where the benzene rings are unsubstituted or the substituents attached to the benzene rings are such that the compound to be cyclized has a plane of symmetry, the desired ring closure will be obtained. However, if the substituents are such that the compound to be cyclized does not have a plane of symmetry, cyclization may yield two compounds, since cyclization may occur in the direction of either of the two aromatic rings, and the relative amounts of each will depend on the number, arrangement and electron donating ability of the substituents. Thus, where the compounds to be cyclized are such that ring B contains a more activating group of substituents than ring A the desired compounds will be formed more easily, and if the activation of ring B is significantly greater than that of ring A, only the desired compounds will virtually be obtained. Compounds with the opposite type substitution pattern, that is, where the activation of ring A is greater than that of ring B, however, can be advantageously obtained via temporary protection of the more active ring closure site by halogenation prior to cyclization and then removing the protecting halogen after ring closure by conventional catalytic hydrogenation. To illustrate, the compound 8-methoxy-1,2,6,7-tetrahydro-11bH-benzo[j]benz[c,d]azulen-2-one is readily obtained by brominating 1-methoxy-5-carboxymethyl-10,11-dihydro-5H-dibenzo[a,d]cycloheptene to obtain the compound 1methoxy-4-bromo-5-carboxymethyl-10,11-dihydro-5H-dibenzo[a,d]cycloheptene, cyclizing the latter with polyphosphoric acid to form the compound 8-methoxy-11-bromo-1,2,6,7-tetrahydro-11bH-benzo[j]benz[c,d]azulen-2-one and then catalytically hydrogenating the latter with palladium catalyst.

It will also be appreciated by those skilled in the art that in the preparation of those compounds of structural formula 1 containing one or more nuclear hydroxyl substituents, it is generally advantageous to protect such groups (s) by acylation or benzylation at an appropriate time during the process or alternatively by employing an appropriately protected starting compound, and then removing the protecting group in conventional manner at an appropriate time. The manner and time of carrying out the above is well within the knowledge of those skilled in the art.

The compounds of structural formula I also exist as optical and/or geometric isomers. Such isomers may be separated by conventional techniques and are included within the scope of this invention.

The compounds of structural formula I are useful because they possess pharmacological activity. In particular, the compounds possess central-nervous system activity and can be utilized as analgesica, sedatives and minor tranquilizers. The compounds are also useful as narcotic antagonists, antihypertensives, vasodilators and antihistamines.

For the above uses the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The compounds may be administered in their free base form or in the form of a pharmaceutically acceptable acid addition salt thereof. Such salts possess the same order of activity as the free base, are readily prepared by reacting the base with the appropriate acid in conventional manner and accordingly are included within the scope of this invention. Representative of such salts are the mineral acid salts such as the hydrochloride, hydrobromide, phosphate, sulfate and the like and the organic acid salts such as the oxalate, fumarate, tartrate, citrate, salicylate, benzoate, acetate, methanesulfonate, benzenesulfonate, toluenesulfonate, sulfamate and the like.

As noted above, the compounds of structural formula I exist as optical and geometric isomers. In some cases greater pharmacological activity or other beneficial attribute may be found with respect to a particular isomer and in such instances administration of such isomer may be preferred.

The dosage employed will, of course, vary depending upon the compound used, the therapy desired and the mode of administration. However, in general satisfactory results are achieved when administered at a daily dosage of from about 10 mg. to about 350 mg.

A representative formulation is a tablet prepared by conventional tabletting techniques and containing the following ingredients:

| Ingredient | Parts by Weight |
| --- | --- |
| 1-dimethylamino-2-hydroxy-1,2,6,7-tetrahydro-11bH-benzo[j]benz[c,d]azulene (or pharmaceutically acceptable salt) | 25 (as the free base) |
| tragacanth | 2 |
| lactose | 64.5 |
| corn starch | 5 |
| talcum | 3 |
| magnesium stearate | 0.5 |

The following examples show representative compounds encompassed within the scope of this invention and the manner in which such compounds are prepared. However, it is to be understood that the examples are for purposes of illustration only and are not intended as in any way limiting the scope of the invention which is defined in the appended claims.

In the examples all temperatures are in degrees centigrade and the parts and percentages are by weight unless otherwise specified. The relationship between parts by weight and parts by volume is the same as that between the kilogram and the liter.

EXAMPLE 1

1-amino-2-hydroxy-1,2,6,7-tetrahydro-11bH-benzo[j]benz[c,d]azylene

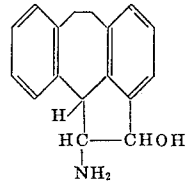

A. Preparation of 5-carboxymethylidene-10,11-dihydro-5H-dibenzo[a,d]cycloheptene A flask containing a solution of 5 parts of p-toluenesulforic acid in 1,000 parts by volume of toluene and fitted with an azeotropic water-removal trap is heated and 404 parts of 5-hydroxy-5-t-butyloxycarbonyl-methyl-10,11-dihydro-5H-dibenzo[a,d]cycloheptene added to the heated solution. The resulting mixture is refluxed until 22 parts by volume of water are collected in the trap. The mixture is then concentrated to a thick crystal slurry and filtered to obtain 215 parts of 5-carboxymethylidene-10,11-dihydro-5H-dibenzo[a,d]cycloheptene, m.p. 167°–170° C. An additional 94 parts of the product is obtained by concentration of the mother liquor.

B. Preparation of 5-carboxymethyl-10,11-dihydro-5H-dibenzo[a,d]cycloheptene

To a suspension of 10.0 parts of 5-carboxymethylidene-10,11-dibenzo-[a,d]cycloheptene in 100 parts by volume of dioxane is added with shaking 0.85 part of palladium-charcoal (10 percent) catalyst in a hydrogen atmosphere. When the hydrogen consumption ceases the resulting mixture is filtered and the catalyst extracted with boiling chloroform. The combined filtrate and extracts is evaporated to obtain 10.0 parts of 5-carboxymethyl-10,11-dihydro-5H-dibenzo[a,d]cycloheptene, m.p. 161°C.

C. Preparation of 1,2,6,7-tetrahydro-11bH-benzo[j]benz[c,d]azulen-2-one

A mixture of 9.6 parts of 5-carboxymethyl-10,11-dihydro-5H-dibenzo-[a,d]cycloheptene and 150 parts of polyphosphoric acid is heated at 90° C. for 2½ hours, then poured onto ice and filtered. The resulting solid precipitate is then washed thoroughly with 2N aqueous sodium hydroxide solution to remove any unreacted starting material and side products and then recrystallized from dimethylformamide to obtain 7.8 parts of 1,2,6,7-tetrahydro-11bH-benzo[j]benz[c,d]azulene-2-one, m.p. 218° C.

D. Preparation of 1-isonitroso-1,2,6,7-tetrahydro-11bH-benzo[j]benzc,d]-azulen-2-one A suspension of 56.2 parts of 1,2,6,7-tetrahydro-11bH-benzo[j]benz-[c,d]azulen-2-one in 360 parts by volume of dry benzene and 480 parts by volume of dry diethylether is cooled to about 0° C. While maintaining the temperature at about 0° C. hydrogen chloride is introduced and 26.5 parts of n-butyl nitrite is added slowly. The introduction of the hydrogen chloride is contained for 3 hours, and an additional 240 parts by volume of dry benzene is added after the first hour. The resulting product is filtered off and washed with diethylether to obtain 1-isonitroso-1,2,6,7-tetrahydro-11bH-benzo[j]benz[c,d]azulen-2-one, m.p. 224°–225° C. Recrystallization from propanol affords product, m.p. 229°–230°C.

E. Preparation of 1-amino-2-hydroxy-1,2,6,7-tetrahydro-11bH-benzo[j]benz-[c,d]azulene A suspension of 30.0 parts of 1-isonitroso-1,2,6,7-tetrahydro-11bH-benzo[j]benz[c,d]azulen-2-one in 12.5 parts of sodium hydroxide and 250 parts by volume of 95 percent aqueous methanol is hydrogenated at room temperature (20° C.) in the presence of 25 parts of Raney Nickel catalyst and under 500 p.s.i.g. hydrogen pressure until 3 moles of hydrogen are taken up. The resulting mixture is then filtered to remove the catalyst. Water is added to the filtrate and the resulting precipitate filtered off to obtain 26.6 parts of 1-amino-2-hydroxy-1,2,6,7-tetrahydro-11bH-benzo[j]benz[c,d]-azulene, m.p. 163°–166° C. The hydrochloride salt thereof (prepared in Guenthard manner) melts at 305°–307° C. (dec.).

EXAMPLE 2

1-methylamino-2-hydroxy-1,2,6,7-tetrahydro-11bH-benzo[j]benz[c,d]azulene

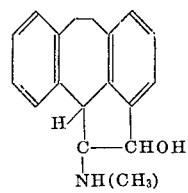

A. Preparation of 1-benzylideneamino-2-hydroxy-1,2,6,7-tetrahydro-11bH-benzo[j]benz[c,d]azulene A mixture of 10 parts of 1-amino-2-hydroxy-1,2,6,7-tetrahydro-11bH-benzo[j]benz[c,d]azulene, 4.2 parts of benzaldehyde, 0.01 part of piperidine and 60 parts by volume of ethanol is refluxed for 4 hours, then poured into ice water and the resulting product filtered off to obtain 1-benzylidenenmino-2-hydroxy-1,2,6,7-tetrahydro-11bH-benzo[j]benz[c,d]azulene, m.p. 164°–167° C.

B. Preparation of 1-benzylamino-2-hydroxy-1,2,6,7-tetrahydro-11bH-benzo[j]benz[c,d]azulene The 1-benzylidenenmino-2-hydroxy-1,2,6,7-tetrahydro-11bH-benzo[j]benz[c,d]azulene obtained in step A is dissolved in 300 parts by volume of dioxane and the resulting solution is hydrogenated in the presence of Raney Nickel catalyst until one mole of hydrogen is taken up. The resulting mixture is then filtered to remove the catalyst and the filtrate evaporated to dryness. The residue is triturated with diethylether and the product filtered off to obtain 9.0 parts of 1-benzylamino-2-hydroxy-1,2,6,7-tetrahydro-11bH-benzo[j]benz[c,d]azulene, m.p. 145°–148° C. Further purification yields product, m.p. 157° C.

C. Preparation of 1-(N-benzyl-N-methyl)amino-2-hydroxy-1,2,6,7-tetrahydro11bH-benzo[j]benz[c,d]azulene A mixture of 8.9 parts of 1-benzylamino-2-hydroxy-1,2,6,7-tetrahydro11bH-benzo[j]benz[c,d]azulene, 6.75 parts by volume of formic acid (85 percent) and 2.40 parts by volume of 40 percent aqueous formaldehyde solution is boiled for 4 hours. The resulting mixture is then cooled and 2 parts by volume of concentrated hydrochloric acid added. The resulting mixture is then evaporated to dryness and the residue treated with 10 percent aqueous sodium carbonate solution and the resulting mixture extracted with chloroform to obtain in the chloroform extract 1-(N-benzyl-N-methyl)amino-2-hydroxy-1,2,6,7-tetrahydro-11bH-benzo[j]benz[c,d]azulene as the free base.

D. Preparation of 1-(N-benzyl-N-methyl)amino-2-hydroxy-1,2,6,7-tetrahydro-11bH-benzo[j]benz[c,d]azulene hydrochloride The chloroform extract obtained in step C is evaporated to dryness and the residue (9.8 parts) dissolved in dry diethylether. Hydrogen chloride is then introduced into the resulting solution and the resulting product filtered off to obtain the hydrochloride salt of 1-(N-benzyl-N-methyl)amino-2-hydroxy-1,2,6,7-tetrahydro-11bH-benzo[j]benz[c,d]azulene.

E. Preparation of 1-methylamino-2-hydroxy-1,2,6,7-tetrahydro-11bH-benzo[j]-benz[c,d]azulene hydrochloride The hydrochloride salt obtained in step D is dissolved in 300 parts by volume of ethanol and the resulting solution hydrogenated at 50° C. in the presence of 3 parts of 10 percent palladium/carbon catalyst and under 50 p.s.i.g. hydrogen pressure. The resulting mixture is filtered to remove the catalyst and then evaporated to dryness to obtain the hydrochloride salt of 1-methylamino-2-hydroxy-1,2,6,7-tetrahydro-11bH-benzo[j]benz[c,d]azulene, m.p. 253°–254° C. The free base, m.p. 180° C. is obtained from the above hydrochloride salt in conventional manner.

EXAMPLE 3

1-dimethylamino-2-hydroxy-1,2,6,7-tetrahydro-11bH-benzo[j]benz[c,d]azulene.

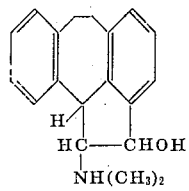

A mixture of 8 parts of 1-amino-2-hydroxy-1,2,6,7-tetrahydro-11bH-benzo[j]benz[c,d]azulene, 10 parts by volume of 90 percent aqueous formic acid and 7 parts by volume of 40 percent aqueous formaldehyde is heated for 4 hours at 100° C. and then cooled to room temperature. To the mixture is then added 4 parts of concentrated hydrochloric acid and then the mixture is evaporated to dryness in vacuo to obtain the hydrochloride salt of 1-dimethyl-amino-2-hydroxy-1,2,6,7-tetrahydro-11bH-benzo[j]benz[c,d]azulene, m.p. 262°–263° C. The free base, m.p. 168°–172° C., is obtained by the addition of ammonia, extraction of the resulting mixture with chloroform and evaporation of the chloroform.

EXAMPLE 4

1-amino-1,2,6,7-tetrahydro-11bH-benzo[j]benz[c,d]azulene.

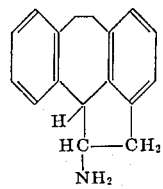

A solution of 7 parts of 1-amino-2-hydroxy-1,2,6,7-tetrahydro-11bH-benzo[j]benz[c,d]azulene in 150 parts by volume of glacial acetic acid and 6 parts by volume of concentrated sulfuric acid is hydrogenated at 60° C. in the presence of finely dispersed palladium metal and under 60 p.s.i.g. of hydrogen pressure. After 1 mole of hydrogen has been taken up, the catalyst is filtered off and the acetic acid distilled off in vacuo. The filtrate is then diluted with 50 parts by volume of water and the resulting mixture rendered basic with sodium hydroxide. The basic mixture is then extracted with diethylether and the ether solution dried. Hydrogen chloride is then introduced into the ether solution to obtain the hydrochloride salt of 1-amino-1,2,6,7-tetrahydro-11bH-benzo[j]benzc,d]azulene. Recrystallization from ethanol-diethylether yields the hydrochloride salt, m.p. 328° C. (dec.).

EXAMPLE 5

1-N-piperidyl-2-hydroxy-1,2,6,7-tetrahydro-11bH-benzo[j]benz[c,d]azylene

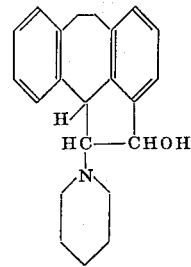

A mixture of 2.51 parts of 1-amino-2-hydroxy-1,2,6,7-tetrahydro-11bH-benzo[j]benz[c,d]azulene, 2.30 parts of 1,5-dibromopentane and 20 parts by volume of toluene is heated under reflux for 3 hours and then 1.7 parts of sodium bicarbonate and 10 parts by volume of toluene are added and the heating continued for an additional 15 hours. The resulting mixture is then cooled to room temperature and chloroform added. The resulting mixture is washed with water and then dried. Ethereal hydrochloric acid is then added to precipitate the hydrochloride salt of 1-N-piperidyl-2-hydroxy-1,2,6,7-tetrahydro-11bH-benzo[j]benz[c,d]azulene.

EXAMPLE 6

1-amino-2-hydroxy-3,4,dimethoxy-1,2,6,7-tetrahydro-11bll-benzo[j]benz[c,d]azulene.

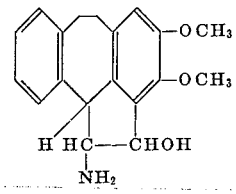

A. Preparation of 2,3-dimethoxy-5-chloro-10,11-dihydro-5H-dibenzo[a,d]cycloheptene A mixture of 250 parts of 2,3-dimethoxy-10,11-dihydro-5H-dibenzo[a,d]-cycloheptene-5-one, 39 parts of sodium borohydride and 2,500 parts by volume of ethanol is refluxed for 2 hours and then poured onto a mixture of 500 parts by volume of 2N hydrochloric acid and 1,500 parts of ice. The resulting solids are filtered off and dissolved in 100 parts by volume of benzene. The benzene solution is washed, then dried and then cooled to about 5° to 10° C. To the solution is then added hydrogen chloride and sufficient chloroform to dissolve any solids which may form. After 1 hour 150 parts of an anhydrous calcium chloride is added and the mixture filtered and the filtrate evaporated to obtain 2,3-dimethoxy-5-chloro-10,11-dihydro-5H-dibenzo-[a,d]cycloheptene, m.p. 110°-117 C. (dec.). Recrystallization from diethylether-petroleum ether affords product, m.p. 125°-128° C. (dec.).

B. Preparation of 2.3-dimethoxy-5-carboxymethyl-10,11-dihydro-5H-dibenzo[a,d]-cycloheptene To diethyl ethoxymagnesium malonate (prepared from 41.3 parts of magnesium turnings and 275 parts of diethyl malonate) is added 500 parts by volume of dry tetrahydrofuran and, with stirring, a solution of 498 parts of 2,3-dimethoxy-5-chloro-10,11-dihydro-5H-dibenzo[a,d]cycloheptene in 2,000 parts by volume of tetrahydrofuran. The mixture is refluxed for 3 hours, then the bulk of the solvent is stripped off and the residue poured over a mixture of 2,000 parts of ice and 1,000 parts by volume of 2N hydrochloric acid. The resulting solids are filtered off and washed to obtain the crude malonic ester derivative. A mixture containing 627 parts of the latter, 368 parts of potassium hydroxide, 885 parts by volume of water and 3,000 parts by volume of ethanol is refluxed for 16 hours, the ethanol recovered and any solids recovered by filtration. The filtrate is washed with diethylether and then rendered acidic with concentrated hydrochloric acid and the resulting solids collected to obtain 484 parts of the malonic acid derivative, m.p. 167°-170° C. The latter is then heated at 190° C. for 2 hours, cooled and the residue recrystallized from methylene chloride-benzene to obtain 2,3-dimethoxy-5-carboxymethyl-10,11-dihydro-5H-dibenzo[a,d]cycloheptene, m.p. 155°-157°C.

C. Preparation of 3,4-dimethoxy-1,2,6,7-tetrahydro-11bH-benzo[j]benzc,d]azulen-2-one To 1,350 parts of polyphosphoric acid, preheated to 60° C., is added 66 parts of 2,3-dimethoxy-5-carboxymethyl-10,11-dihydro-5H-dibenzo[a,d]-cycloheptene and the mixture stirred vigorously for 38 minutes while maintaining the temperature at 60° C. The mixture is then poured on ice, the resulting solids dissolved in benzene and the benzene solution washed with sodium carbonate solution. The benzene solution is neutralized, dried and evaporated to obtain 3,4-dimethoxy-1,2,6,7-tetrahydro-11bH-benzo[j]benz[c,d]azulen-2-one. Recrystallization from benzene affords product, m.p. 116°-120° C.

D. Preparation of 1-isonitroso-3,4-dimethoxy-1,2,6,7-tetrahydro-11bH-benzo-[j]benz[c,d]azulen-2-one To a suspension of 14.7 parts of 3,4-dimethoxy-1,2,6,7-tetrahydro-11bH-benzo[j]benz[c,d]azulen-2-one in 45 parts by volume of methyl cellosolve and 15 parts by volume of hydrochloric acid is added 7.5 parts by volume of n-butyl nitrite. After 45 minutes at room temperature an additional 5 parts by volume of hydrochloric acid and 5 parts by volume of n-butyl nitrite is added. The mixture is then heated at 40° C. for 15 minutes and then poured onto 200 parts by volume of ice water. The residue is recovered by filtration, washed first with water and then with 50 percent aqueous ethanol to obtain 1-isonitroso-3,4-dimethoxy-1,2,6,7-tetrahydro-11bH-benzo[j]benz[c,d]azulen-2one, m.p. 208°-212° C.

E. Preparation of 1-acetamino-3,4-dimethoxy-1,2,6,7-tetrahydro-11bH-benzo-[j]benz[c,d]azulen-2-one A mixture of 14.2 parts of 1-isonitroso-3,4-dimethoxy-1,2,6,7-tetrahydro-11bH-benzo[j]benz[c,d]azulen-2-one, 71 parts by volume of acetic acid, 71 parts by volume of acetic anhydride and 1.8 parts of palladium/charcoal (10 percent) catalyst is hydrogenated at room temperature and under 500 p.s.i.g. hydrogen pressure. The mixture is then filtered to remove the catalyst and the catalyst washed. The combined filtrate and washings are then evaporated to obtain 1-acetamino-3,4-dimethoxy-1,2,6,7-tetrahydro-11bH-benzo[j]benz[c,d]azulen-2-one.

F. Preparation of 1-acetamino-2-hydroxy-3,4-dimethoxy-1,2,6,7-tetrahydro-11bH-benzo[j]benz[c,d]azulene A mixture of 12.7 parts of 1-acetamino-3,4-dimethoxy-1,2,6,7-tetrahydro-11bH-benzo[j]benz[c,d]azulen-2-one, 350 parts by volume of ethanol and 3.5 parts of sodium borohydride is refluxed for 2 hours, then cooled, filtered and the residue obtained washed to obtain 1-acetamino-2-hydroxy-3,4-dimethoxy-1,2,6,7-tetrahydro-11bH-benzo[j]benz[c,d]azulene, m.p. 272°-276° C.

G. Preparation of 1-amino-2-hydroxy-3,4-dimethoxy-1,2,6,7-tetrahydro-11bH-benzo[j]benz[c,d]azulene A mixture of 9.0 parts of 1-acetamino-2-hydroxy-3,4-dimethoxy-1,2,6,7-tetrahydro-11bH-benzo[j]benz[c,d]azulene, 550 parts by volume of 1 percent aqueous hydrochloric acid and 74 parts by volume of ethanol is refluxed for 16 hours, then cooled and washed with ether. The pH of the aqueous layer is then adjusted to 10. The crude base is then extracted with benzene and the benzene solution evaporated. The residue obtained is dissolved in a mixture of chloroform and ether and hydrogen chloride is introduced into the resulting solution to obtain the hydrochloride salt of 1-amino-2-hydroxy-3,4-dimethoxy-1,2,6,7-tetrahydro-11bH-benzo[j]benz-[c,d]azulene, m.p. 228°-231° C.

EXAMPLE 7

1-dimethylamino-2-hydroxy-3,4-dimethoxy-1,2,6,7-tetrahydro-11bH-benzo[j]-benz[c,d]azulene.

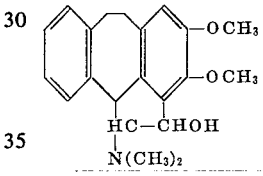

A mixture of 4.4 parts of 1-amino-2-hydroxy-3,4-dimethoxy-1,2,6,7-tetrahydro-11bH-benzo[j]benz[c,d]azulene, 4.64 parts of 90 percent formic acid and 3.26 parts of 37 percent formaldehyde solution is heated at 90° C. for 2 hours. To the resulting mixture is added 1.88 parts of hydrochloric acid and the mixture then evaporated to dryness. The residue is recrystallized from ethanol-ether to obtain the hydrochloride salt of 1-dimethylamino-2-hydroxy-3,4-dimethoxy-1,2,6,7-tetrahydro-11bH-benzo[j]benz[c,d]azulene, m.p. 185°-189° C. (dec.).

EXAMPLE 8

1-amino-3-hydroxy-4-methoxy-1,2,6,7-tetrahydro-11bH-benzo[j]benz[c,d]-azulen-2-one.

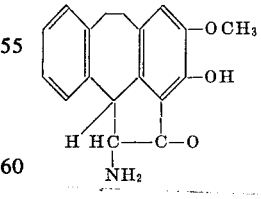

A Preparation of 3-hydroxy-4-methoxy-1,2,6,7-tetrahydro-11bH-benzo[j]benz-[c,d]azulen-2-one A mixture of 50 parts of 2,3-dimethoxy-5-carboxymethyl-10,11-dihydro-5H-dibenzo[a,d]cycloheptene, 65 parts by volume of thionyl chloride and 150 parts by volume of benzene is refluxed for 2½ hours. The solvent and excess thionyl chloride is then removed in vacuo. The residue is added to 500 parts by volume of carbon disulfide and the resulting mixture added, within 30 minutes, to a stirred mixture of 25.6 parts of aluminum chloride and 1,000 parts by volume of carbon disulfide and the resulting mixture cooled to −5° C. An additional 25.6 parts of aluminum chloride is then added, the mixture refluxed for 2 hours and then poured onto a mixture of 3,000 parts of ice and 500 parts by volume of 2N hydrochloric acid. The organic layer is then separated, washed, dried and evaporated. The resulting residue is crystalized in ethyl acetate to obtain 3-hydroxy-4-methoxy-1,2,6,7-tetrahydro-11bH-benzo[j]benz[c,d]-azulen-2-one, m.p. 156° C.

B. Preparation of 3-acetoxy-4-methoxy-1,2,6,7-tetrahydro-11bH-benzo[j]benz-[c,d]azulen-2-one A mixture of 33.5 parts of 3-hydroxy-4-methoxy-1,2,6,7-tetrahydro-11bH-benzo[j]benz[c,d]azulen-2-one, 670 parts by volume of acetic anhydride and 13.5 parts by volume of pyridine is heated at 60° C. for 20 minutes, then cooled with ice and filtered to obtain 22.0 parts of 3-acetoxy-4-methoxy-1,2,6,7-tetrahydro-11bH-benzo[j]benz[c,d]azulen-2-one, m.p. 190°-192° C. Evaporation of the mother liquor affords an additional 15 parts of product.

C. Preparation of 1-isonitroso-3-acetoxy-4-methoxy-1,2,6,7-tetrahydro-11bH-benzo[j]benz[c,d]azulen-2-one To a suspension of 3 parts of 3-acetoxy-4-methoxy-1,2,6,7-tetrahydro-11bH-benzo[j]benz[c,d]azulen-2-one in 30 parts of methyl cellosolve is added 2 parts by volume of n-butyl nitrite and then, dropwise, 4 parts by volume of concentrated hydrochloric acid. After allowing the resulting mixture to stand at room temperature for 1 hour, an additional 2 parts by volume of n-butyl nitrite and 4 parts by volume of concentrated hydrochloric acid are added. After standing at room temperature for an additional 30 minutes, the mixture is filtered to yield 1-isonitroso-3-acetoxy-4-methoxy-1,2,6,7-tetrahydro-11bH-benzo[j]benz[c,d]azulen-2-one, m.p. 211°-213° C. (dec.).

D. Preparation of 1-acetamino-3-acetoxy-4-methoxy-1,2,6,7-tetrahydro-11bH-benzo[j]benz[c,d]azulen-2-one A mixture of 37 parts of 1-isonitroso-3-acetoxy-4-methoxy-1,2,6,7-tetrahydro-11bH-benzo[j]benz[c,d]azulen-2-one, 350 parts by volume of glacial acetic acid, 360 parts by volume of acetic anhydride and 4.4 parts of palladium/charcoal (10 percent) catalyst is hydrogenated at 40°-50° C. under 700 p.s.i.g. of hydrogen pressure, then filtered and the catalyst washed with warm chloroform. The combined filtrates are then evaporated to yield 41.4 parts of 1-acetamino-3-acetoxy-4-methoxy-1,2,6,7-tetrahydro-11bH-benzo[j]benz[c,d]azulen-2-one.

E. Preparation of 1-amino-3-hydroxy-4-methoxy-1,2,6,7-tetrahydro-11-benzo-[j]benz[c,d]azulen-2-one 1-acetamino-3-acetoxy-4-methoxy-1,2,6,7-tetrahydro-11bH-benzo[j]-benz[c,d]azulen-2-one, 5 parts, is dissolved in 100 parts by volume of boiling glacial acetic acid and then 100 parts by volume of concentrated hydrochloric acid is added dropwise. After refluxing the mixture for 2 hours, 0.01 parts of charcoal is added and the mixture filtered and the filtrate evaporated to dryness. The residue is recrystallized from ethanol-ether to obtain the hydrochloride salt of 1-amino-3-hydroxy-4-methoxy-1,2,6,7-tetrahydro-11bH-benzo[j]benz[c,d]azulen-2-one, m.p. 187°-202° C. (dec.).

EXAMPLE 9

1-amino-2,3-dihydroxy-4-methoxy-1,2,6,7-tetrahydro-11bH-benzo[j]benz[c,d]-azulene.

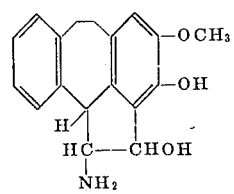

To a mixture of 1.37 parts of sodium borohydride and 20 parts by volume of ethanol maintained at 0° C. is slowly added a solution of 3.90 parts of 1-amino-3-hydroxy-4-methoxy-1,2,6,7-tetrahydro-11bH-benzo[j]benz[c,d]azulen-2-one hydrochloride in 70 parts by volume of ethanol and 10 parts by volume of water. After 55 minutes ice water is added and the pH of the mixture adjusted to 8 to obtain 3.21 parts of 1-amino-2,3-dihydroxy-4-methoxy-1,2,6,7-tetrahydro-11bH-benzo[j]benz[c,d]azulene, m.p. 190°-195° C. The hydrochloride salt of the product has a melting point of 197°-200° C. (dec.).

EXAMPLE 10

1-ethylamino-2,3-dihydroxy-4-methoxy-1,2,6,7-tetrahydro-11bH-benzo-[j]benz[c,d]azulene

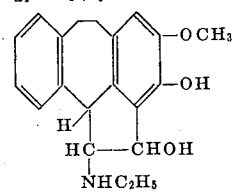

To a refluxing mixture of 1.18 parts of lithium aluminum hydride in 400 parts by volume of ether is added (by Soxhlet technique) 3.79 parts of 1-acetamino-3-acetoxy-4-methoxy-1,2,6,7-tetrahydro-11bH-benzo[j]benz[c,d]azulen-2-one. After the addition is completed the mixture is cooled to 0° C. and 200 parts by volume of 2N sulfuric acid added slowly. To the separated aqueous phase is then added sufficient solid lithium carbonate to bring the pH thereof to 6. The mixture is then heated to reflux, filtered and the pH adjusted to 8.5. The filtrate is extracted with chloroform to obtain 1-ethylamino-2,3-dihydroxy-4-methoxy-1,2,6,7-tetrahydro-11bH-benzo[j]benz[c,d]azulene.

EXAMPLE 11

1-amino-3,4-dihydroxy-1,2,6,7-tetrahydro-11bH-benzo[j]benz[c,d]-azulene

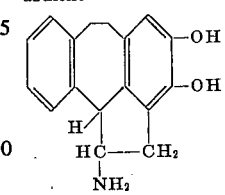

A. Preparation of 1-acetamino-3,4-dimethoxy-1,2,6,7-tetrahydro-11bH-benzo[j]-benz[c,d]azulene A solution of 40 parts of 1-isonitroso-3,4-dimethoxy-1,2,6,7-tetrahydro-11bH-benzo[j]benz[c,d]azulen-2-one in 200 parts by volume of acetic anhydride and 200 parts by volume of acetic acid is hydrogenated at 95° C. in the presence of palladium/charcoal (10 percent) catalyst and at a hydrogen pressure of 1,000 p.s.i.g. The mixture is then filtered and the filtrate evaporated to dryness. The residue is crystallized from isopropyl alcohol to obtain 1-acetamino-3,4-dimethoxy-1,2,6,7-tetrahydro-11bH-benzo[j]benz[c,d]azulene, m.p. 245°-247° C.

B. Preparation of 1-amino-3,4-dihydroxy-1,2,6,7-tetrahydro-11bH-benzo[j]benz-[c,d]azulene A mixture of 1-acetamino-3,4-dimethoxy-1,2,6,7-tetrahydro-11bH-benzo-[j]benz[c,d]azulene (prepared in step A) and 20 percent aqueous hydrochloric acid is heated to 150° C. to obtain the hydrochloride salt of 1-amino-3,-4-dihydroxy-1,2,6,7-tetrahydro-11bH-benzo[j]benz[c,d]azulene.

EXAMPLE 12

1-dimethylamino-3,4-dimethoxy-1,2,6,7-tetrahydro-11bH-benzo[j]benz-[j]benz[c,d]-azulen-2-one.

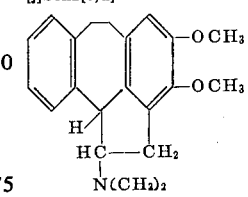

A. Preparation of 1-bromo-3,4-dimethoxy-1,2,6,7-tetrahydro-11bH-benzo[j]-benz[c,d]azulen-2-one A mixture of 2 parts of 3,4-dimethoxy-1,2,6,7-tetrahydro-11bH-benzo[j]benz[c,d]azulen-2-one, 3.2 parts of cupric bromide and 30 parts by volume of dioxane is heated at 90° C. for 18 hours and then cooled. A solution of 2 parts of potassium bromide in 60 parts by volume of water is then added and the mixture filtered. The residue is recrystallized from isopropyl alcohol to obtain 1-bromo-3,4-dimethoxy-1,2,6,7-tetrahydro-11bH-benzo[j]benz[c,d]azulen-2-one, m.p. 162°–164° C.

B. Preparation of 1-dimethylamino-3,4-dimethoxy-1,2,6,7-tetrahydro-11bH-benzo-[j]benz[c,d]azulen-2-one To a mixture of 1-bromo-3,4-dimethoxy-1,2,6,7-tetrahydro-11bH-benzo-[j]benz[c,d]azulen-2-one (obtained in step A) in 20 parts by volume of benzene is added an excess of dimethylamine. The resulting mixture is then allowed to stand overnight to obtain the desired 1-dimethylamino-3,-4-dimethoxy-1,2,6,7-tetrahydro-11bH-benzo[j]benz[c,d]azulen-2-one.

EXAMPLE 13

Following the procedure of example 12 and employing an equivalent amount of the amines enumerated below in place of the dimethylamine used in step B thereof, there are obtained the products set forth below.

| Amine | Product |
|---|---|
| 1. Ethylenimine | 1-ethylenimino-3,4-dimethoxy-1,2,6,7-tetrahydro-11bH-benzo[j]benz[c,d]azulen-2-one |
| 2. Pyrrolidine | 1-pyrrolidinyl-3,4-dimethoxy-1,2,6,7tetrahydro-11bH-benzo[j]benz[c,d]2-one |
| 3. Piperidine | 1-piperidino-3,4-dimethoxy-1,2,6,7-tetrahydro-11bH-benzo[j]benz[c,d]azulen-2-one |
| 4. Piperazine | 1-piperazino-3,4-dimethoxy-1,2,6,7-tetrahydro-11bH-benzo[j]benz[c,d]azulen-2-one |
| 5. 1-methyl-4-piperazine | 1-(1-methyl-4-piperazinyl)-3,4-dimethoxy-1,2,6,7-tetrahydro-11bH-benzo[j]benz[c,d]azulen-2-one |
| 6. Morpholine | 1-morpholino-3,4-dimethoxy-1,2,6,7-tetrahydro-11bH-benzo[j]benz[c,d]azulen-2-one |
| 7. Thiomorpholine | 1-thiomorpholino-3,4-dimethoxy-1,2,6,7-tetrahydro-11bH-benzo[j]benz[c,d]2-one |
| 8. Imidazolidine | 1-imidazolidinyl-3,4-dimethoxy-1,2,6,7-tetrahydro-11bH-benzo[j]benz[c,d]2-one |
| 9. Pyrazolidine | 1-pyrazolidinyl-3,4-dimethoxy-1,2,6,7-tetrahydro-11bH-benzo[j]benz[c,d]azulen-2-one |
| 10. Thiazolidine | 1-thiazolidinyl-3,4-dimethoxy-1,2,6,7-tetrahydro-11bH-benzo[j]benz[c,d]azulen-2-one |
| 11. N-ethyl-N-methylamine | 1-(N-ethyl-N-methylamino)-3,4-dimethoxy-1,2,6,7-tetrahydro-11bH-benzo[j]benz[c,d]azulen-2-one |
| 12. Diethylamine | 1-diethylamino-3,4-dimethoxy-1,2,6,7-tetrahydro-11bH-benzo[j]benz[c,d]azulen-2-one |

EXAMPLE 14

Following the procedure of example 6 step F and employing the products enumerated in example 13 for the 1-acetamino-3,4-dimethoxy-1,2,6,7-tetrahydro-11bH-benzo[j]benz[c,d]azulen-2-one used in step F of example 6, there are obtained the products set forth below.

Products 1. 1-ethylenimino-2-hydroxy-3,4-dimethoxy-1,2,6,7-tetrahydro-11bH-benzo[j]-benz[c,d]azulene 2. 1-pyrrolidinyl-2-hydroxy-3,4-dimethoxy-1,2,6,7-tetrahydro-11bH-benzo[j]-benz[c,d]azulene
3. 1-piperidino-2-hydroxy-3,4-dimethoxy-1,2,6,7-tetrahydro-11bH-benzo[j]-benz[c,d]azulene
4. 1-piperazino-2-hydroxy-3,4-dimethoxy-1,2,6,7-tetrahydro-11bH-benzo[j]-benz[c,d]azulene
5. 1-(1-methyl-4-piperazinyl)-2-hydroxy-3,4-dimethoxy-1,2,6,7-tetrahydro-11bH-benzo[j]benz[c,d]azulene
6. 1-morpholino-2-hydroxy-3,4-dimethoxy-1,2,6,7-tetrahydro-11bH-benzo[j]-benz[c,d]azulene
7. 1-thiomorpholino-2-hydroxy-3,4-dimethoxy-1,2,6,7-tetrahydro-11bH-benzo-[j]benz[c,d]azulene
8. 1-imidazolidinyl-2-hydroxy-3,4-dimethoxy-1,2,6,7-tetrahydro-11bH-benzo[j]-benz[c,d]azulene
9. 1-pyrazolidinyl-2-hydroxy-3,4-dimethoxy-1,2,6,7-tetrahydro-11bH-benzo[j]-benz[c,d]azulene
10. 1-thiazolidinyl-2-hydroxy-3,4-dimethoxy-1,2,6,7-tetrahydro-11bH-benzo[j]-benz[c,d]azulene
11. 1-(N-ethyl-N-methylamino)-2-hydroxy-3,4-dimethoxy-1,2,6,7-tetrahydro-11bH-benzo[j]benz[c,d]azulene
12. 1-diethylamino-2-hydroxy-3,4-dimethoxy-1,2,6,7-tetrahydro-11bH-benzo[j]-benz[c,d]azulene

EXAMPLE 15

Following the procedure of example 4 and employing the products enumerated in example 14 in place of the 1-amino-2-hydroxy-1,2,6,7-tetrahydro-11bH-benzo-[j]benz[c,d]azulene used in example 4, there are obtained the products set forth below.

Products 1. 1-ethylenimino-3,4-dimethoxy-1,2,6,7-tetrahydro-11bH-benzo[j]benz[c,d]azulene
2. 1-pyrrolidinyl-3,4-dimethoxy-1,2,6,7-tetrahydro-11bH-benzo[j]benz[c,d]azulene
3. 1-piperidino-3,4-dimethoxy-1,2,6,7-tetrahydro-11bH-benzo[j]benz[c,d]azulene
4. 1-piperazino-3,4-dimethoxy-1,2,6,7-tetrahydro-11bH-benzo[j]benz[c,d]azulene
5. 1-(1-methyl-4-piperazinyl)-3,4-dimethoxy-1,2,6,7-tetrahydro-11bH-benzo[j]-benz[c,d]azulene
6. 1-morpholino-3,4-dimethoxy-1,2,6,7-tetrahydro-11bH-benzo[j]benz[c,d]azulene
7. 1-thiomorpholino-3,4-dimethoxy-1,2,6,7-tetrahydro-11bH-benzo[j]benz[c,d]-azulene
8. 1-imidazolidinyl-3,4-dimethoxy-1,2,6,7-tetrahydro-11bH-benzo[j]benz[c,d]-azulene
9. 1-pyrazolidinyl-3,4-dimethoxy-1,2,6,7-tetrahydro-11bH-benzo[j]benz[c,d]-azulene
10. 1-thiazolidinyl-3,4-dimethoxy-1,2,6,7-tetrahydro-11bH-benzo[j]benz[c,d]azulene
11. 1-(N-ethyl-N-methylamino)-3,4-dimethoxy-1,2,6,7-tetrahydro-11bH-benzo[j]-benz[c,d]azulene
12. 1-diethylamino-3,4-dimethoxy-1,2,6,7-tetrahydro-11bH-benzo[j]benz[c,d]azulene

EXAMPLE 16

1-amino-1-methyl-2-hydroxy-3,4,9,10-tetramethoxy-1,2,6,7-tetrahydro-11bH-ben]o[j]zbenz[c,d]azulene

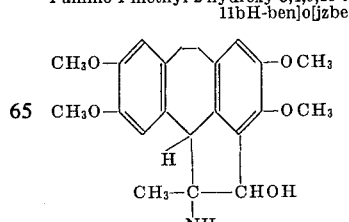

A. Preparation of 2,3,7,8-tetramethoxy-5-α-carboxyethyl-10,11-dihydro-5H-dibenzo[a,d]cycloheptene To a solution maintained at 15° C. and containing 5 parts of 3, 3', 4, 4'-tetramethoxydibenzyl and 3.5 parts of ethyl ββ- diethoxyisobuty-rate in 50 parts by volume of glacial acetic acid is added, dropwise, 30 parts by volume of concentrated sulfuric acid while maintaining the reaction temperature of 10°–15 C. After the reaction proceeds for 16 hours at the above temperature, the mixture is then poured onto ice and the resulting mixture extracted with chloroform. The chloroform extract is crystallized with 10 parts of methanol to yield 2,3,7,8-tetramethoxy-5-α-carboxyethyl-10,11-dihydro-5H-dibenzo[a,d]cycloheptane, m.p. 134°–136° C.

B. Preparation of 1-methyl-3,4,9,10-tetramethoxy-1,2,6,7-tetrahydro-11bH-benzo[j]benz[c,d]azulen-2-one The 2,3,7,8-tetramethoxy-5-α-carboxyethyl-10-11-dihydro-5H-dibenzo-[a,d]cycloheptene obtained in step A is saponified by refluxing the same with alcoholic potassium hydroxide and the mixture then acidified to obtain the free acid. The latter is then cyclized using polyphosphoric acid in the manner described in step C of example 6 to obtain 1-methyl-3,4,9,10-tetramethoxy-1,2,6,7-11bH-benzo[j]benz[c,d]azulen-2-one.

C. Preparation of 1-methyl-1-nitroso-3,4,9,10-tetramethoxy-1,2,6,7-tetrahydro-11bH-benzo[j]benz[c,d]azulen-2-one Following the procedure of example 6, step D and employing an equivalent amount of 1-methyl-3,4,9,10-tetramethoxy-1,2,6,7-tetrahydro-11bH-benzo[j]benz[c,d]azulen-2-one for the 3,4-dimethoxy-1,2,6,7-tetrahydro-11bH-benzo[j]benz[c,d]azulen-2-one used therein there is obtained the product 1-methyl-1-nitroso-3,4,9,10-tetramethoxy-1,2,6,7,-tetrahydro-11bH-benzo[j]benz[c,d]azulen-2-one.

D. Preparation of 1-methyl-1-acetamino-3,4,9,10-tetramethoxy-1,2,6,7-tetrahydro-11bH-benzo[j]benz[c,d]azulen-2-one Following the procedure of example 6, step E and employing an equivalent amount of 1-methyl-1-nitroso-3,4,9,10-tetramethoxy-1,2,6,7-tetrahydro-11bH-benzo[j]benz[c,d]azulen-2-one in place of the 1-*isonitroso*-3,4-dimethoxy-1,2,6,7-tetrahydro-11H-benzo[j]benz[c,d]azulen-2-one used therein there is obtained the product 1-methyl-1-acetamino-3,4,9,10-tetramethoxy-1,2,6,7-tetrahydro-11bH-benzo[j]benz[c,dazulen-2-one.

E. Preparation of 1-methyl-1-acetamino-2-hydroxy-3,4,9,10-tetramethoxy-1,2,6,7-tetrahydro-11bH-benzo[j]benz[c,d]azulene Following the procedure of example 6, step F and employing and equivalent amount of 1-methyl-acetamino-3,4,9,10-tetramethoxy-1,2,6,7-tetrahydro-11bH-benzo[j]benz[c,d]azulen-2-one in place of the 1-acetamino-3,4-di-methoxy-1,2,6,7-tetrahydro-11bH-benzo[j]benz[c,d]azulen-2-one used therein there is obtained the product 1-methyl-1-acetamino-2-hydroxy-3,4,9,10-tetramethoxy-1,2,6,7-tetrahydro-11bH-benzo[j]benz[c,d]azulene.

F. Preparation of 1-amino-1-methyl-2-hydroxy-3,4,9,10-tetramethoxy-1,2,6,7-tetrahydro-11bH-benzo[j]benz[c,d]azulene Following the procedure of example 6, step G and employing an equivalent amount of 1-methyl-1-acetamino-2-hydroxy-3,4,9,10-tetramethoxy-1,2,6,7-tetrahydro-11bH-benzo[j]benzc,d]azulene Following the procedure of example 6, step G and employing an equivalent amount of 1-methyl-1-acetamino-2-hydroxy-3,4,9,10-tetramethoxy-1,2,6,7-tetrahydro-11bH-benzo[j]benzc,d]azulene in place of the 1-acetamino-2-hydroxy-3,4-dimethoxy-1,2,6,7-tetrahydro-11bH-benzo[j]benz[c,dazulene used therein there is obtained the product 1-amino-1-methyl-2-hydroxy-3,4,9,10-tetramethoxy-1,2,6,7-tetrahydro-11bH-benzo[j]benz[c,d]azulene.

What is claimed is:

1. A compound of the formula

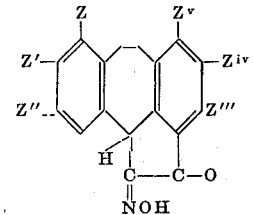

wherein each of Z, Z', Z"Z"', $Z^{iv}$ and $Z^{v}$ represent hydrogen, hydroxy, lower alkoxy, lower alkanoyloxy or benzyloxy.

2. A compound of the formula

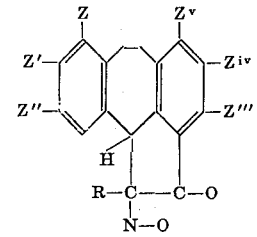

wherein each of Z, Z', Z", Z"', $Z^{iv}$ and $Z^{v}$ represent hydrogen, hydroxy, lower alkoxy, lower alkanoyloxy or benzyloxy and R represents lower alkyl.

3. The compound of claim 1 which is 1-isonitroso-1,2,6,7-tetrahydro-11bH-benzo[j]benz[c,d]azulen-2-one.

4. The compound of claim 1 which is 1-isonitroso-3,4-dimethoxy-1,2,6,7-tetrahydro-11bH-benzo[j]benz[c,d]azulen-2-one.

5. The compound of claim 1 which is 1-isonitroso-3-acetoxy-4-methoxy-1,2,6,7-tetrahydro-11bH-benzo[j]benz[c,d]azulen-2-one.

* * * * *